(12) United States Patent
Russi-Vigoya et al.

(10) Patent No.: US 12,248,757 B2
(45) Date of Patent: Mar. 11, 2025

(54) TRANSFORMING CONTENT TO SUPPORT NEURODIVERGENT COMPREHENSION OF THE CONTENT

(71) Applicant: INTERNATIONAL BUSINESS MACHINES CORPORATION, Armonk, NY (US)

(72) Inventors: Natalia Russi-Vigoya, Round Rock, TX (US); Jennifer M. Hatfield, San Francisco, CA (US); Jill S. Dhillon, Jupiter, FL (US); Juhi Bharat, Highland Park, NJ (US); Joshua Totte, Santa Monica, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/184,852

(22) Filed: Mar. 16, 2023

(65) Prior Publication Data
US 2024/0311583 A1    Sep. 19, 2024

(51) Int. Cl.
G06F 40/166    (2020.01)
G06F 40/42    (2020.01)

(52) U.S. Cl.
CPC ............ *G06F 40/42* (2020.01); *G06F 40/166* (2020.01)

(58) Field of Classification Search
None
See application file for complete search history.

(56) References Cited

U.S. PATENT DOCUMENTS 7,779,354 B2    8/2010   Ashcraft
8,731,905 B1 *  5/2014   Tsang .................... G06F 40/289
                                                             704/4

(Continued)

FOREIGN PATENT DOCUMENTS

WO    2022174804 A1    8/2022

OTHER PUBLICATIONS

Paulino et al., "Modelling Aspects of Cognitive Personalization in Microtask Design: Feasibility and Reproducibility Study with Neurodivergent People," 2024 27th International Conference on Computer Supported Cooperative Work in Design (CSCWD), Tianjin, China, 2024, pp. 1552-1558. (Year: 2024).*

(Continued)

*Primary Examiner* — Amelia L Tapp
(74) *Attorney, Agent, or Firm* — Elliot J. Shine

(57) ABSTRACT

An embodiment for a method of supporting neurodivergent comprehension of content by proactively identifying and transforming predicted difficult comprehension areas for a given user. The embodiment may receive an activation command from a registered user. The embodiment may automatically identify, within displayed content, predicted difficult comprehension areas based on a series of preferences and behaviors associated with the registered user. The embodiment may mark a textual element associated with the predicted difficult comprehension areas that may be transformed to improve comprehensibility of the predicted difficult comprehension areas for the registered user. The embodiment may detect user interaction with the marked textual element. The embodiment may, in response to detecting user interaction with the marked textual element, transform the marked textual element and provide transformed content to the registered user.

20 Claims, 3 Drawing Sheets

(56) References Cited

U.S. PATENT DOCUMENTS

| | | | |
|---|---|---|---|
| 10,108,902 B1 | 10/2018 | Lockett | |
| 10,387,565 B2 | 8/2019 | Hoover | |
| 10,915,697 B1 | 2/2021 | Guliak | |
| 11,270,603 B1* | 3/2022 | Bansal | G09B 21/009 |
| 11,631,400 B2* | 4/2023 | Lee | G10L 15/063 |
| | | | 704/232 |
| 11,972,211 B1* | 4/2024 | Singh | G06F 40/284 |
| 2007/0150801 A1 | 6/2007 | Chidlovskii | |
| 2008/0228749 A1 | 9/2008 | Brown | |
| 2010/0190143 A1* | 7/2010 | Gal | G09B 7/00 |
| | | | 434/322 |
| 2017/0169120 A1 | 6/2017 | Neff | |
| 2019/0114300 A1 | 4/2019 | Miltsakaki | |
| 2019/0140995 A1* | 5/2019 | Roller | H04L 51/18 |
| 2020/0118542 A1* | 4/2020 | Larson | G09B 19/04 |
| 2020/0159986 A1 | 5/2020 | Djamasbi | |
| 2022/0188514 A1* | 6/2022 | Thota | G06F 40/253 |

OTHER PUBLICATIONS

Walkowiak, "Neurodiversity of the workforce and digital transformation: The case of inclusion of autistic workers at the workplace," Technological Forecasting & Social Change 168 (2021), pp. 1-11. (Year: 2021).*

Austin Learning Solutions, "Dyslexia Facts and Statistics", https://austinlearningsolutions.com/blog/38-dyslexia-facts-and-statistics, [Accessed on Feb. 27, 2023], 5 Pages.

Disclosed Anonymously, "Method and system for Providing Personalized Content by Adapting to Learning Style of a User", IP.com, IPCOM000252383D, Jan. 5, 2018, 3 Pages.

Disclosed Anonymously, "PM Session : The system of listening HTML content (Web Player)", IP.com, IPCOM000193265D, Feb. 17, 2010, 3 Pages.

Disclosed Anonymously, "Machine Translation of Detailed Technical Language into Reading Level-Appropriate Language", IP.com, IPCOM000253217D, Mar. 14, 2018, 4 Pages.

Disclosed Anonymously, "System and Method for Better Reading and Understanding in an EReader," IP.com, IPCOM000240249D, Jan. 15, 2015, 3 Pages.

Disclosed Anonymously, "Text adjustment to help people with learning disabilities," IP.com, IPCOM000028740D, May 28, 2004, 3 Pages.

Dyslexia Help, "Support for Dyslexics and Web Resources", http://dyslexiahelp.umich.edu/tools/informational-websites, [Accessed on Feb. 27, 2023], 4 Pages.

Easy Reading, "Keeping the user at the digital original", https://www.easyreading.eu/, [Accessed on Feb. 27, 2023], 6 pages.

Google Play, Gboard—the Google Keyboard, Google LLC, https://play.google.com/store/apps/details?id=com.google.android.inputmethod.latin&hl=en_US&gl=US, [Accessed on Feb. 27, 2023, 4 pages.

Grammarly, "Great Writing, Simplified", https://www.grammarly.com/, [Accessed on Feb. 27, 2023], 6 pages.

Helperbird, "One extension for Accessibility", https://www.helperbird.com/, [Accessed on Feb. 27, 2023], 21 pages.

IBM, "IBM AbilityLab Content Clarifier", https://www.IBM.com/able/content-clarifier.html, [Accessed on Feb. 27, 2023], 4 Pages.

Institute of Multisensory Education, "12 Famous People Who Struggled With Dyslexia Before Changing the World", https://journal.imse.com/12-famous-people-who-struggled-with-dyslexia-before-changing-the-world/, Nov. 21, 2017, 8 Pages.

Knebel, "Dyslexia reading strategies for students", https://www.readandspell.com/us/dyslexia-reading-strategies, [Accessed on Feb. 27, 2023], 7 pages.

Liebenberg, "Lexico: A Dyslexia Reading Aid", https://apps.apple.com/us/app/lexico-a-dyslexia-reading-aid/d1375659541, [Accessed on Feb. 27, 2023] 3 Pages.

Mather, et al., "Dyslexia Around the World: A Snapshot", ResearchGate, Jan. 2020, 18 Pages. https://www.researchgate.net/publication/338910143_Dyslexia_Around_the_World_A_Snapshot.

Microsoft, "Microsoft SwiftKey Keyboard" https://www.microsoft.com/en-us/swiftkey?activetab=pivot_1:primaryr2, [Accessed on Feb. 27, 2023], 8 Pages.

Reynolds et al., "I'm Never Happy with What I Write": Challenges and Strategies of People with Dyslexia on Social Media, Twelfth International AAAI Conference on Web and Social Media (ICWSM 2018), 10 Pages.

Speechify, The #1 Text to Speech Reader https://speechify.com/, [Accessed on Feb. 27, 2023], 14 Pages.

Stanley, "Two-Part Stimulus Integration and Specific Reading Disability", Perceptual and Motor Skills, 1975, pp. 873-874.

* cited by examiner

TRANSFORMING CONTENT TO SUPPORT NEURODIVERGENT COMPREHENSION OF THE CONTENT

BACKGROUND

The present application relates generally to computers, and more particularly, to supporting neurodivergent comprehension of content by proactively identifying and transforming predicted difficult comprehension areas for a given user.

Neurodivergence refers to variations in how a human brain may function, which can lead to differences in cognitive processing, sensory perception, and communication. One of the most common neurodivergent conditions is dyslexia. Dyslexia is a learning disorder that affects reading and language processing abilities. For example, individuals with dyslexia may have difficulties with spelling words, reading quickly, writing words, 'sounding out' words, pronouncing words when reading aloud and understanding what was read, among other difficulties that are typically specific to the individual. In the modern era, comprehension of digital content is becoming increasingly prevalent within most organizations and workplaces. Improved comprehension of digital content may yield improved communication and performance within a variety of business settings. Accordingly, many businesses seek to provide accommodations and tools to neurodivergent individuals to facilitate comprehension of content.

SUMMARY

According to one embodiment, a method, computer system, and computer program product for supporting neurodivergent comprehension of content by proactively identifying and transforming predicted difficult comprehension areas for a given user is provided. The embodiment may include receiving an activation command from a registered user. The embodiment may further include automatically identifying, within displayed content, predicted difficult comprehension areas based on a series of preferences and behaviors associated with the registered user. The embodiment may further include marking a textual element associated with the predicted difficult comprehension areas that may be transformed to improve comprehensibility of the predicted difficult comprehension areas for the registered user. The embodiment may also include detecting user interaction with the marked textual element. The embodiment may further include, in response to detecting user interaction with the marked textual element, transforming the marked textual element. The embodiment may also include, in response to transforming the marked textual element, providing transformed content to the registered user.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
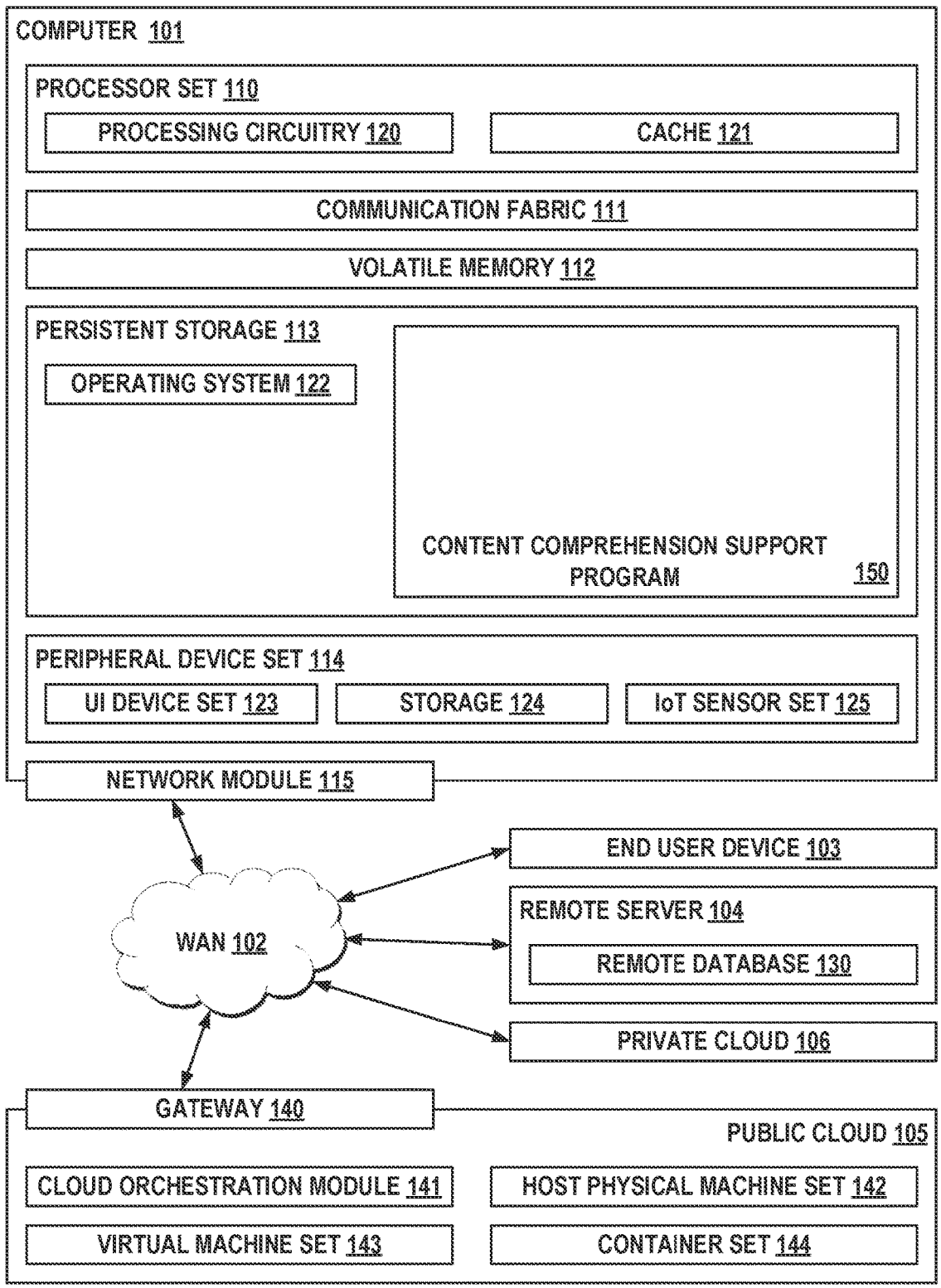
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computers, and more particularly, to supporting neurodivergent comprehension of content by proactively identifying and transforming predicted difficult comprehension areas for a given user. The following described exemplary embodiments provide a system, method, and program product to, among other things, receive an activation command from a registered user, automatically identify, within displayed content, predicted difficult comprehension areas based on a series of preferences and behaviors associated with the registered user, mark a textual element associated with the predicted difficult comprehension areas that may be transformed to improve comprehensibility of the predicted difficult comprehension areas for the registered user, detect user interaction with the marked textual element, in response to detecting user interaction with the marked textual element, transform the marked textual element, and in response to transforming the marked textual element, provide transformed content to the registered user. Therefore, the presently described embodiments have the capacity to improve supporting of neurodivergent comprehension of content by making digital content more accessible to registered users of the presently described systems by leveraging their preferences and behaviors to automatically identify predicted difficult comprehension areas using machine learning techniques. Presently described embodiments may then transform textual elements associated with the difficult comprehension areas to facilitate comprehension and increase accessibility for the registered user. Certain presently described embodiments further include a feedback module to obtain feedback and continuously improve the ability of described embodiments to identify predicted difficult comprehension areas and to directly address textual elements contained therein by performing a most effective transformation on the textual elements for facilitating the registered user's comprehension based on the registered users preferences and behaviors.

As previously described, neurodivergence refers to variations in how a human brain may function, which can lead to differences in cognitive processing, sensory perception, and communication. One of the most common neurodivergent conditions is dyslexia. Dyslexia is a learning disorder that affects reading and language processing abilities. For example, individuals with dyslexia may have difficulties with spelling words, reading quickly, writing words, 'sounding out' words, pronouncing words when reading aloud and understanding what was read, among other difficulties that are typically specific to the individual. In the modern era, comprehension of digital content is becoming increasingly prevalent within most organizations and workplaces. Improved comprehension of digital content may yield improved communication and performance within a variety of business settings. Accordingly, many businesses seek to provide accommodations and tools to neurodivergent individuals to facilitate comprehension of content.

While there are some available accommodations and tools to support neurodivergent comprehension of content, many of these tools are not specifically designed for facilitating the use of digital content. Additionally, presently available tools for supporting neurodivergent comprehension of content are too generic, lacking the ability to accommodate and properly support individuals who each experience unique individualized challenges requiring unique solutions or accommodations depending on the target digital content being consumed. This results in many of the presently available tools lacking intelligent capabilities needed to sufficiently identify and predict difficult comprehension areas within digital content, as it will vary from user to user.

Accordingly, a method, computer system, and computer program product for improving the supporting of neurodivergent comprehension of content by proactively identifying and transforming predicted difficult comprehension areas for a given user is provided. The method, system, and computer program product may receive an activation command from a registered user. The method, system, computer program product may automatically identify, within displayed content, predicted difficult comprehension areas based on a series of preferences and behaviors associated with the registered user. The method, system, computer program product may then mark a textual element associated with the predicted difficult comprehension areas that may be transformed to improve comprehensibility of the predicted difficult comprehension areas for the registered user. The method, system, computer program product may then detect user interaction with the marked textual element. The method, system, computer program product may, in response to detecting user interaction with the marked textual element, transform the marked textual element Thereafter, the method, system, computer program product may, in response to transforming the marked textual element, provide transformed content to the registered user. In turn, the method, system, computer program product has provided for improved supporting of neurodivergent comprehension of content by making digital content more accessible to registered users of the presently described systems by leveraging their preferences and behaviors to automatically identify predicted difficult comprehension areas using machine learning techniques. Presently described embodiments transform textual elements associated with the difficult comprehension areas to facilitate comprehension and increase accessibility for the registered user. Certain presently described embodiments further include a feedback module to obtain feedback and continuously improve the ability of described embodiments to identify predicted difficult comprehension areas and to directly address textual elements contained therein by performing a most effective transformation on the textual elements for facilitating the registered user's comprehension based on the registered users' preferences and behaviors. Accordingly, the registered user is supported by a custom process that is suited to their specific preferences and behaviors that offers content transformation to improve comprehension by the registered user of displayed content.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as content comprehension support program/code 150. In addition to content comprehension support code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and content comprehension support code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in content comprehension support code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in content comprehension support code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102.

Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the content comprehension support program 150 may be a program capable of receiving an activation command from a registered user. Content comprehension support program 150 may automatically identify, within displayed content, predicted difficult comprehension areas based on a series of preferences and behaviors associated with the registered user. Content comprehension support program 150 may then mark a textual element associated with the predicted difficult comprehension areas that may be transformed to improve comprehensibility of the predicted difficult comprehension areas for the registered user. Next, content comprehension support program 150 may detecting user interaction with the marked textual element. Then, content comprehension support program 150 may, in response to detecting user interaction with the marked textual element, transform the marked textual element. Thereafter, content comprehension support program 150 may, in response to transforming the marked textual element, provide transformed content to the registered user. Described embodiments thus provide for improved supporting of neurodivergent comprehension of content by making digital content more accessible to registered users of the presently described systems by leveraging their preferences and behaviors to automatically identify predicted difficult comprehension areas using machine learning techniques. Presently described embodiments transform textual elements associated with the difficult comprehension areas to facilitate comprehension and increase accessibility for the registered user. Certain presently described embodiments further include a feedback module to obtain feedback and continuously improve the ability of described embodiments to identify predicted difficult comprehension areas and to directly address textual elements contained therein by performing a most effective transformation on the textual elements for facilitating the registered user's comprehension based on the registered users' preferences and behaviors. Accordingly, the registered user is supported by a custom process that is suited to their specific preferences and behaviors that offers content transformation to improve comprehension by the registered user of displayed content.

Figure 2:
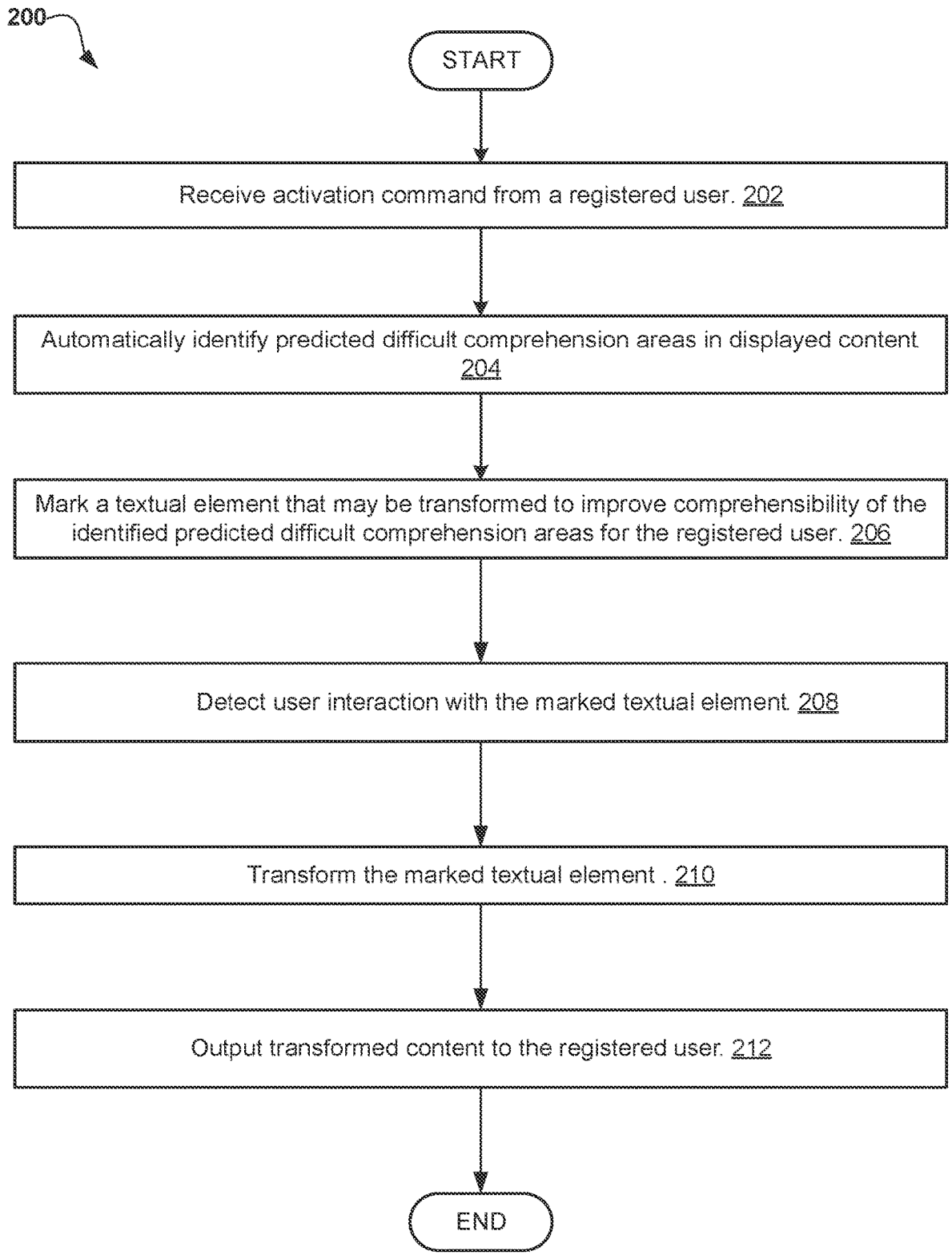
FIG. 2 illustrates an operational flowchart for a process of supporting neurodivergent comprehension of content by proactively identifying and transforming predicted difficult comprehension areas for a given user according to at least one embodiment.

Referring now to FIG. 2, an operational flowchart is provided depicting an illustrative process 200 for supporting neurodivergent comprehension of content by proactively identifying and transforming predicted difficult comprehension areas for a given user according to at least one embodiment.

Figure 3:
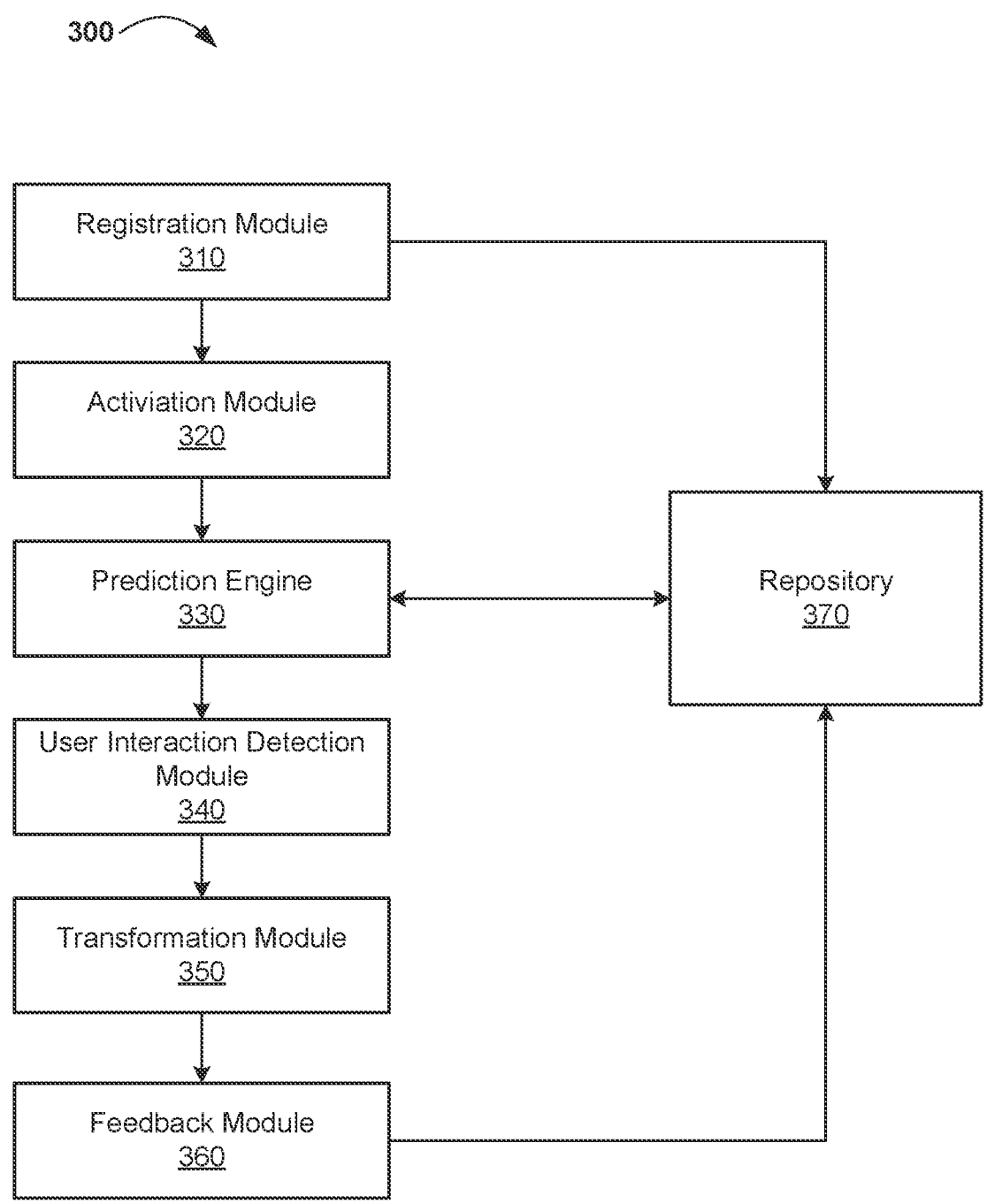
FIG. 3 illustrates exemplary system architecture for supporting neurodivergent comprehension of content by proactively identifying and transforming predicted difficult comprehension areas for a given user according to at least one embodiment.

FIG. 3 illustrates exemplary system architecture 300 usable by an illustrative content comprehension support program 150 for performing process 200 of supporting neurodivergent comprehension of content by proactively identifying and transforming predicted difficult comprehension areas for a given user according to at least one embodiment. As shown in FIG. 3, illustrative embodiments of content comprehension support program 150 may include a registration module 310 for registering new users and storing obtained user preferences and behaviors, an activation module 320 for activating or enabling comprehension support program 150, a prediction engine 330 for identifying predicted difficult comprehension areas, an interaction detection module 340 for identifying user interaction with textual elements associated with the predicted difficult comprehension areas, a transformation module for transforming the textual elements associated with the predicted difficult comprehension areas, and optionally a feedback module 360. As shown, elements exemplary of system architecture 300 may be configured communicate with a repository 370 capable of receiving data to be stored. In some embodiments, repository 370 may be accessed by various elements of exemplary architecture 300 in performing illustrative process 200 for supporting neurodivergent comprehension of content by proactively identifying and transforming predicted difficult comprehension areas for a given user according to at least one embodiment. System architecture will be discussed in greater detail below in connection with the detailed description of illustrative process 200.

At 202, content comprehension support program 150 may receive an activation command from a registered user. Content comprehension support program 150 may include an exemplary activation module 320, as shown in FIG. 3, configured to receive or detect an activation command being input by the registered user on any suitable computer or device employing comprehension support program 150. In some embodiments, for example, the registered user may send the activation command to comprehension support program 150 by pressing a hotkey or shortcut on a keyboard of their device. In other embodiments, the registered user may send the activation command to comprehension support program 150 using any peripheral device capable of allowing the registered user to send a specific input to the computer or device employing comprehension support program 150 that may be recognized as an activation command (i.e. key on a keyboard, a mouse button, a USB controller, etc.) by the activation module 320. In various embodiments, comprehension support program 150 may be employed with any suitable device or computer capable of displaying digital content and having sufficient specifications to support the system architecture of comprehension support program 150. In some embodiments, it is envisioned that content comprehension support program 150 may be configured to be employed with known augmented reality (AR), virtual reality (VR), and mixed reality (XR) technologies and peripherals that may be useful in performing various steps of illustrative process 200.

As discussed above, content comprehension support program 150 may further include a registration module 310 for registering new users. In embodiments, content comprehension support program 150 may maintain a profiles for each of the registered users within repository 370 that include data relating to preferences and behaviors associated with each specific registered user. The preferences and behaviors associated with each registered user may be obtained by registration module 310 during an illustrative user registration process. In embodiments, for example, registration module 310 of comprehension support program 150 may be configured to present a new user attempting to register with a questionnaire designed to gather data related to user preferences and behaviors. The gathered preferences and behaviors for each registered user may then be stored within repository 370. In embodiments, exemplary questionnaires relied upon during an illustrative user registration process may include questions taken from known standardized tests for diagnosing dyslexia. In other embodiments, content comprehension support program 150 may be configured to pose more targeted custom questions designed to identify unique strengths or challenges a given user experiences when consuming digital content. For example, exemplary questionnaires may include questions asking a registering user about their preferences relating to their preferred line spacing within a paragraph, preferences between consuming audio or visual content, preferences relating to utilizing a generated summary to facilitate comprehension of a lengthy passage, preferred font sizes, preferred font styles, preferred justifications of text as it relates to layout and lining of passages, preferences regarding visual aids, and any other suitable preferences that may be used to identify predicted areas of difficult comprehension within digital content for a given registered user. Once a user has completed the registration process, registration module 320 may store the obtained data for each registered user within repository 370. How the obtained data including registered user preferences and behaviors is utilized will be discussed in greater detail below.

In embodiments, comprehension support program 150 may be configured to, in response to receiving the activation command, perform various actions to clearly indicate that comprehension support program 150 has been activated. For example, in embodiments, comprehension support program 150 may send a notification to the registered user indicating that comprehension support program 150 has been activated via a push notification or toast notification on the device employing comprehension support program 150. In other embodiments, in response to receiving the activation command, comprehension support program 150 may be configured to convert a cursor of the computer or device employing comprehension support program 150 into a predefined custom cursor associated with comprehension support program 150 being active.

Next, at 204, content comprehension support program 150 may automatically identify, within displayed content, predicted difficult comprehension areas based on a series of preferences and behaviors associated with the registered user. Once activated, content comprehension support program 150 will seek to leverage the stored preference and behavior data (within repository 370) associated with the registered user who input the activation command at 202 to proactively identify any predicted difficult comprehension areas that the registered user may experience within any displayed content actively being viewed by the registered user on the computer or device employing comprehension support program 150. To accomplish this, comprehension support program 150 may utilize an exemplary prediction engine 330. An exemplary prediction engine 330 may include any suitable known natural language processing and machine learning algorithms/models, or any suitable known neural networks capable of leveraging natural language processing models to identify predicted difficult comprehension areas. For example, in embodiments, a pre-trained natural language processing model utilized by an exemplary prediction engine 330 of comprehension support program 150 may be trained to identify features of text within content being displayed that may pose difficulties for neurodivergent users, such as long or complex sentences, uncommon vocabulary, or non-linear narrative structures. In embodiments, NLP models employed by prediction engine 330 may be configured to identify features in text that may be associated with features or preferences corresponding to the questionnaires, as discussed above with respect to FIG. 3, used by registration module 310 when gathering preference and behavior data for each of the registered users. For example, comprehension support program 150 may gather preferences via a questionnaire for an exemplary registered user 'R1' indicating that registered user 'R1' prefers generated summaries for paragraphs exceeding 12 lines and for paragraphs including complex language. Thereafter, prediction engine 330 may leverage natural language processing models to process an exemplary displayed text 'T1' and identify exemplary paragraph 'P6', including 22 lines of text and over a dozen instances of graduate reading-level words having simplified synonyms available, as a predicted difficult comprehension area. In embodiments, comprehension support program 150 may be configured to highlight or otherwise visually indicate to a registered user a passage associated with a predicted difficult comprehension area. For example, in the example above, in embodiments, comprehension support program 150 may highlight paragraph 'P6' in yellow.

Next, at 206, comprehension support program 150 may mark a textual element associated with the predicted difficult comprehension areas that may be transformed to improve comprehensibility of the predicted difficult comprehension areas for the registered user. In embodiments, the textual element may include any amount of natural language, such as, for example, a word, a phrase, a sentence, or a paragraph. In the context of this disclosure the word 'mark' as it applied to marking a textual element may include any visual emphasis or marking assigned to a given textual element. For example, comprehension support program 150 may mark the textual element by underlining the text, bolding, italicizing, highlighting, applying a symbol on or near the textual element, or by using or adding any other visual emphasis to the textual element associated with the predicted difficult comprehension area. In embodiments, comprehension support program 150 marks textual elements associated with the predicted difficult comprehension areas to indicate to the user that comprehension support program 150 has predicted that the textual element may be transformed to improve comprehensibility of the predicted difficult comprehension area for the registered user based on their unique preferences and behaviors. In embodiments, comprehension support program 150 may be configured to mark a textual element in response to detecting that a registered user is hovering over the textual element, demarcated for example by specific hypertext markup language (HTML) tags, that are capable of being transformed. For example, returning to the example above, in embodiments, if the exemplary registered user 'R1' hovers their cursor over textual elements 'TE1' associated with paragraph 'P6', then comprehension support program 150 may underline the textual elements 'TE1' within paragraph P6 to indicate that the registered user may take advantage of an available transformation that may facilitate comprehension of paragraph 'P6' for the registered user by applying a transformation.

At 208, content comprehension support program 150 may detect user interaction with the marked textual element. Detectable user interaction with a marked textual element may include, for example, a user clicking, selecting, or otherwise engaging with any marked textual element. Content comprehension support program 150 include a user interaction detection module 340 configured to detect user interaction with a marked textual element. User interaction may involve the use of any suitable peripherals or selection mechanisms (manual or device-assisted). For example, in some embodiments, user interaction may include using a mouse to click on the marked textual element, while in other embodiments, user interaction may include the user selecting the marked textual element by pressing their finger to the marked textual element on a touch screen monitor to interact with it. Returning to the example above, this step may include the registered user 'R1' hovering their cursor over underlined textual element 'TE1', and then interacting with the textual element by using a mouse to click it. Content comprehension support program 150 would detect the click made by registered user 'R1' as the user interacting with the marked textual element 'TE1'. In practice, the registered user interacts with the marked element (which is marked to indicate it is capable of being transformed) to indicate that the registered user is interested in having content comprehension support program 150 modify the marked textual element in a way that may facilitate comprehension of the associated predicted difficult comprehension area.

At 210, content comprehension support program 150 may, in response to detecting user interaction with the marked textual element, transform the marked textual element. Now that the registered user has interacted with the marked textual element, content comprehension support program 150 may modify the textual element in a way that is predicted to facilitate comprehension of the associated predicted difficult comprehension area for the registered user. A transformation module 350 of content comprehension support program 150 may be configured to perform a variety of predetermined transformations on a marked textual element involving actions that may include one or more of word simplification, alternative transformed content modalities, input from external learning disorder applications, input derived from publicly available third-party learning disorder websites, or summarization mechanisms. Transformation module 350 of content comprehension support program 150 may be configured to include or utilize any known tools or algorithms for performing desired transformations.

In embodiments, examples of suitable transformations may include modification of words, sentences, paragraphs, font, style, or layouts for a given difficult comprehension area. Other suitable transformations may involve deploying known software or tools designed to assist in comprehension for the registered user. Yet another suitable transformation may involve changing the format of the digital content, such as, for example, changing digital content involving text into an audio format. Content comprehension support program 150 may be configured to perform transformations directly related to the questions asked and data gathered when registering the registered user. Additional exemplary transformations performable by content comprehension support program 150 will be discussed in greater detail below. These examples are only illustrative, and it is envisioned that content comprehension support program 150 may be configured to perform a variety of transformations on marked textual elements as new techniques and tools for improving comprehension are discovered over time.

In some embodiments, content comprehension support program 150 may transform textual elements by performing simplification of words within digital content. Content comprehension support program 150 may also be configured to transform long or complex words into sight words or simple words. In other embodiments, content comprehension support program 150 may transform textual elements by switching information channels. For example, if the user indicates that they prefer consuming auditory content for text exceeding a certain length, content comprehension support program 150 may be configured to transform marked textual elements associated with text exceeding that length into an auditory form that the registered user may listen to. In some embodiments, content comprehension support program 150 may be configured to synchronize applications that support the self-confidence of a registered user. For example, during registration, content comprehension support program 150 may ask the user if they currently employ or utilize any tools or applications to improve comprehension. If the registered user identifies such a tool or application, content comprehension support program 150 may be configured to synchronize the identified application or tool with content comprehension support program 150 to provide the same benefits. In embodiments, content comprehension support program 150 may even store useful data extracted from the synchronized applications. For example, content comprehension support program 150 may extract data from a third-party application associated with a registered user including information relating to time intervals after which a registered user may need a break, or a time interval after which the registered user may prefer to switch from text content to audio content. In yet another embodiment, content comprehension support program 150 may be configured to transform marked textual elements by using known tools to generate summaries, thereby providing shorter and simpler versions of marked textual elements that are associated with a lengthy predicted difficult comprehension area. These transformation examples are only illustrative, and it is envisioned that content comprehension support program 150 may be configured to perform a variety of transformations on marked textual elements as new techniques and tools for improving comprehension are discovered over time.

Returning to the illustrative example referenced above during the description of previous steps in process 200, at step 210, in response to detecting that the exemplary registered user 'R1' has clicked on marked textual element 'TE1', content comprehension support program 150 may transform the marked textual element 'TE1' to improve comprehension of the predicted difficult comprehension area, exemplary paragraph 'P6', for registered user 'R1'. As discussed above, content comprehension support program 150 predicted 'P6' would present a predicted difficult comprehension area for registered user 'R1' based on the stored preferences and behavior of 'R1' because paragraph 'P6' included 22 lines of text and over a dozen instances of graduate reading-level words having simplified synonyms available. As discussed above, this results in paragraph 'P6' exceeding an upper limit for the length preferences of 'R1' and indicates that the paragraph exceeds the preferred complexity indicated for registered user 'R1'. Accordingly, at 210, content comprehension support program 150 may transform the marked textual element 'TE1'. Content comprehension support program 150 will thus transform the marked textual element 'TE1' in a targeted way to address the predicted difficult comprehension area in view of the preferences and behaviors of the registered user 'R1'. In this instance, for example, content comprehension support program 150 may utilize transformation module 350 to generate a shortened summary of the marked textual elements 'TE1' in paragraph 'P6' using known summary generating tools, and then further transform the text by replacing the complex words contained therein with simplified synonyms or sight words. Accordingly, by transforming the marked textual elements, content comprehension support program 150 has generated content that may facilitate comprehension of the predicted difficult comprehension area for the registered user based on unique individual preferences and behaviors.

Thereafter, at 212, content comprehension support program 150 may, in response to transforming the marked textual element, provide transformed content to the registered user. The transformed content may include any content output by content comprehension support program 150 that is generated by transforming a marked textual element that has been interacted with by a registered user. The transformed content may be provided to the registered user through any suitable user interface, and preferably, in the same format as the displayed content including the predicted difficult comprehension areas.

In embodiments, content comprehension support program 150 may further include an exemplary feedback module 360 configured to gather feedback from the registered user regarding the transformed content. Feedback module 360 may gather feedback by presenting questions about the helpfulness of the transformed content to the registered user using a suitable user interface. The presented questions may be sent simultaneously with the transformed content, or at a preconfigured later time thereafter. In embodiments, feedback module 360 of content comprehension support program 150 may then store the gathered feedback within exemplary repository 370. For example, in an exemplary embodiment, feedback module 360 of content comprehension support program 150 may present a registered user with a prompt asking for a numerical rating between 1 and 5 for how helpful a provided instance of transformed content was for the registered user, where received numerical ratings closer to 1 indicate that the transformed content was less helpful and received numerical ratings closer to 5 indicate that the transformed content was more helpful. The stored feedback from registered users may function as accessible historical data that may be leveraged by prediction engine 330 to continuously learn and improve its ability to identify predicted different comprehension areas within displayed content, and to predict most suitable transformations for facilitating comprehension for the registered user. The stored feedback from registered users may include data related to the transformations themselves, as well as additional data about the preferences and behaviors of the registered user. For example, in embodiments, content comprehension support program 150 may gather feedback from a registered user about a specific selected transformation that was performed, how helpful it was for the registered user to address a particular challenge or preference, and what style or features of that specific transformation were most helpful. This stored data may then be leveraged by prediction engine 330 to, over time, continuously improve the ability of prediction engine 330 of content comprehension support program 150 to identify predicted difficult comprehension areas for a registered user, and to then select a most helpful transformation to perform thereafter to facilitate comprehension for a given registered user.

It will be appreciated that content comprehension support program 150 thus provides for improved supporting of neurodivergent comprehension of content by making digital content more accessible to registered users of the presently described systems by leveraging their preferences and behaviors to automatically identify predicted difficult comprehension areas using machine learning techniques. Presently described embodiments transform textual elements associated with the difficult comprehension areas to facilitate comprehension and increase accessibility for the registered user. As discussed above, certain presently described embodiments further include a feedback module to obtain feedback and continuously improve the ability of described embodiments to identify predicted difficult comprehension areas and to directly address textual elements contained therein by performing a most effective transformation on the textual elements for facilitating the registered user's comprehension based on the registered users' preferences and behaviors. Accordingly, the registered user is supported by a custom process that is suited to their specific preferences and behaviors that offers content transformation to improve comprehension by the registered user of displayed content.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of supporting neurodivergent comprehension of content comprising:
retrieving responses to a questionnaire, the retrieved responses including a series of reading preferences and behaviors associated with a registered user;
receiving an activation command from the registered user;
automatically identifying, within displayed content, predicted difficult comprehension areas using a pre-trained natural language processing model based on the series of reading preferences and behaviors associated with the registered user;
marking a textual element associated with the predicted difficult comprehension areas that may be transformed to improve comprehensibility of the predicted difficult comprehension areas for the registered user;
detecting user interaction with the marked textual element;
in response to detecting user interaction with the marked textual element, transforming the marked textual element to address the predicted difficult comprehension areas based on the series of reading preferences and behaviors associated with the registered user;
in response to transforming the marked textual element, providing transformed content and an associated feedback questionnaire to the registered user; and
gathering feedback from the registered user in response to one or more prompts included in the associated feedback questionnaire, wherein the one or more prompts request a numerical rating from the registered user, and are related to the provided transformed content and features of a specific transformation applied to the marked textual element, storing the feedback, wherein the pre-trained natural language processing model is retrained based on the stored feedback to identify and transform additional difficult comprehension areas specific to the registered user.

2. The computer-based method of claim 1, further comprising:
storing the retrieved series of reading preference and behaviors associated with the registered user in an accessible repository.

3. The computer-based method of claim 1, wherein automatically identifying, within the displayed content, the predicted difficult comprehension areas based on the series of preferences and behaviors associated with the registered user further comprises:
processing the displayed content using the pre-trained natural language processing model and machine learning algorithms to identify the predicted difficult comprehension areas based on the series of preferences and behaviors associated with the registered user.

4. The computer-based method of claim 1, wherein the detected user interaction comprises the registered user clicking on the marked textual element, and wherein transforming the marked textual elements comprises at least one of word simplifications, alternative transformed content modalities, layout transformations, font transformations, style transformations, input from external learning disorder applications, input from publicly available learning disorder websites, and summarizations.

5. The computer-based method of claim 1, further comprising:
in response to receiving the activation command, generating and outputting a notification to the registered user; and
converting a cursor to a predetermined custom cursor.

6. The computer-based method of claim 1, wherein automatically identifying the predicted difficult comprehension areas further comprises:
processing a displayed text of the displayed content using the pre-trained natural language processing model; and displaying using one or more visual indicators the predicted difficult comprehension areas within the displayed text of the displayed content to the registered user.

7. The computer-based method of claim 6, wherein the one or more visual indicators includes at least highlighting one or more words within the displayed text for which simplified synonyms are available.

8. The computer-based method of claim 1, marking the textual element associated with the predicted difficult comprehension areas, further comprises:
demarcating, within the displayed content, each textual element within the predicted difficult comprehension areas for which a corresponding transformation is available to the registered user, wherein the demarcating includes at least underlining each of the textual elements.

9. The computer-based method of claim 8, wherein the corresponding transformation directly corresponds to the responses to the questionnaire retrieved for the registered user.

10. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
retrieving responses to a questionnaire, the retrieved responses including a series of reading preferences and behaviors associated with a registered user;
receiving an activation command from the registered user;
automatically identifying, within displayed content, predicted difficult comprehension areas using a pre-trained natural language processing model based on the series of reading preferences and behaviors associated with the registered user;
marking a textual element associated with the predicted difficult comprehension areas that may be transformed to improve comprehensibility of the predicted difficult comprehension areas for the registered user;
detecting user interaction with the marked textual element;
in response to detecting user interaction with the marked textual element, transforming the marked textual element to address the predicted difficult comprehension areas based on the series of reading preferences and behaviors associated with the registered user;
in response to transforming the marked textual element, providing transformed content and an associated feedback questionnaire to the registered user; and
gathering feedback from the registered user in response to one or more prompts included in the associated feedback questionnaire, wherein the one or more prompts request a numerical rating from the registered user, and are related to the provided transformed content and features of a specific transformation applied to the marked textual element, storing the feedback, wherein the pre-trained natural language processing model is retrained based on the stored feedback to identify and transform additional difficult comprehension areas specific to the registered user.

11. The computer system of claim 10, further comprising:
storing the retrieved series of reading preference and behaviors associated with the registered user in an accessible repository.

12. The computer system of claim 10, wherein automatically identifying, within the displayed content, the predicted difficult comprehension areas based on the series of preferences and behaviors associated with the registered user further comprises:
processing the displayed content using the pre-trained natural language processing model and machine learning algorithms to identify the predicted difficult comprehension areas based on the series of preferences and behaviors associated with the registered user.

13. The computer system of claim 10, wherein the detected user interaction comprises the registered user clicking on the marked textual element, and wherein transforming the marked textual elements comprises at least one of word simplifications, alternative transformed content modalities, layout transformations, font transformations, style transformations, input from external learning disorder applications, input from publicly available learning disorder websites, and summarizations.

14. The computer system of claim 10, further comprising:
in response to receiving the activation command, generating and outputting a notification to the registered user; and
converting a cursor to a predetermined custom cursor.

15. The computer system of claim 10, wherein automatically identifying the predicted difficult comprehension areas further comprises:
processing a displayed text of the displayed content using the pre-trained natural language processing model; and
displaying using one or more visual indicators the predicted difficult comprehension areas within the displayed text of the displayed content to the registered user.

16. A computer program product, the computer program product comprising:
one or more computer-readable tangible storage medium and program instructions stored on at least one of the one or more computer-readable tangible storage medium, the program instructions executable by a processor capable of performing a method, the method comprising:
retrieving responses to a questionnaire, the retrieved responses including a series of reading preferences and behaviors associated with a registered user;
receiving an activation command from the registered user;
automatically identifying, within displayed content, predicted difficult comprehension areas using a pre-trained natural language processing model based on the series of reading preferences and behaviors associated with the registered user;
marking a textual element associated with the predicted difficult comprehension areas that may be transformed to improve comprehensibility of the predicted difficult comprehension areas for the registered user;
detecting user interaction with the marked textual element;
in response to detecting user interaction with the marked textual element, transforming the marked textual element to address the predicted difficult comprehension areas based on the series of reading preferences and behaviors associated with the registered user;
in response to transforming the marked textual element, providing transformed content and an associated feedback questionnaire to the registered user; and gathering feedback from the registered user in response to one or more prompts included in the associated feedback questionnaire, wherein the one or more prompts request a numerical rating from the registered user, and are related to the provided transformed content and features of a specific transformation applied to the marked textual element, storing the feedback, wherein the pre-trained natural language processing model is retrained based on the stored feedback to identify and transform additional difficult comprehension areas specific to the registered user.

17. The computer program product of claim 16, further comprising:
storing the retrieved series of reading preference and behaviors associated with the registered user in an accessible repository.

18. The computer program product of claim 16, wherein automatically identifying, within the displayed content, the predicted difficult comprehension areas based on the series of preferences and behaviors associated with the registered user further comprises:
processing the displayed content using the pre-trained natural language processing model and machine learning algorithms to identify the predicted difficult comprehension areas based on the series of preferences and behaviors associated with the registered user.

19. The computer program product of claim 16, wherein the detected user interaction comprises the registered user clicking on the marked textual element, and wherein transforming the marked textual elements comprises at least one of word simplifications, alternative transformed content modalities, layout transformations, font transformations, style transformations, input from external learning disorder applications, input from publicly available learning disorder websites, and summarizations.

20. The computer program product of claim 16, wherein automatically identifying the predicted difficult comprehension areas further comprises:
processing a displayed text of the displayed content using the pre-trained natural language processing model; and
displaying using one or more visual indicators the predicted difficult comprehension areas within the displayed text of the displayed content to the registered user.

* * * * *